United States Patent
Takahashi et al.

(10) Patent No.: US 6,846,860 B2
(45) Date of Patent: Jan. 25, 2005

(54) BIODEGRADABLE PLASTIC COMPOSITION, A MOLDED ARTICLE THEREOF AND A METHOD FOR CONTROLLING BIODEGRADATION RATE

(75) Inventors: Ikuo Takahashi, Chiba (JP); Hirotaka Iida, Chiba (JP); Norimasa Nakamura, Chiba (JP); Tsuyoshi Takeuchi, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 64 days.

(21) Appl. No.: 10/418,288

(22) Filed: Apr. 18, 2003

(65) Prior Publication Data

US 2003/0228478 A1 Dec. 11, 2003

(30) Foreign Application Priority Data

Apr. 18, 2002 (JP) ........................................ 2002-116092

(51) Int. Cl.$^7$ ................................................. C08K 5/29
(52) U.S. Cl. ........................ 524/128; 524/195; 524/323
(58) Field of Search ................................. 524/128, 195, 524/323

(56) References Cited

U.S. PATENT DOCUMENTS

| | | | |
|---|---|---|---|
| 2,941,956 A | 6/1960 | Bergstrom | 252/418 |
| 5,484,881 A | 1/1996 | Gruber et al. | 528/354 |

FOREIGN PATENT DOCUMENTS

| | | | |
|---|---|---|---|
| EP | 0 890 604 | | 1/1999 |
| EP | 1 188 530 | | 3/2002 |
| EP | 1 193 050 | | 4/2002 |
| GB | 1 224 635 | * | 3/1971 |
| JP | 47-33279 | | 8/1972 |
| JP | 4-168149 | | 6/1992 |
| JP | 409296097 | * | 4/1996 |
| JP | 9-12688 | | 1/1997 |
| JP | 11-80522 | | 3/1999 |
| JP | 2001-525473 | | 12/2001 |

OTHER PUBLICATIONS

Campbell, T.W. et al., "High Polymers Containing the Carbodiimide Repeat Unit" Journal of Organic Chemistry, vol. 28, No. 8 (Aug. 1963), pp. 2069–2075.
Williams, et al., Chemical Reviews, vol. 81, No. 4 (1981), pp. 619–621.

* cited by examiner

*Primary Examiner*—D. Lawrence Tarazano
(74) *Attorney, Agent, or Firm*—Westerman, Hattori, Daniels & Adrian, LLP

(57) ABSTRACT

A biodegradable plastic composition enabling to stably adjust biodegradation rate, improve hydrolysis resistance and heat resistance, and retain transparency, molded articles thereof and a method for controlling biodegradation rate of the biodegradable plastic. In more detail, a biodegradable plastic composition, characterized in that said composition is made by compounding 100 parts by weight of a biodegradable plastic (A), in particular, an aliphatic type polyester with 0.01 to 5 parts by weight of a carbodiimide compound (B) and 0.01 to 3 parts by weight of an antioxidant (C), in particular, a hindered phenol type antioxidant with a molecular weight of not less than 400 alone or mixed antioxidants of said hindered phenol type antioxidant and a phosphite type antioxidant, a molded article thereof and a method for controlling biodegradation rate of the biodegradable plastic.

20 Claims, No Drawings

BIODEGRADABLE PLASTIC COMPOSITION, A MOLDED ARTICLE THEREOF AND A METHOD FOR CONTROLLING BIODEGRADATION RATE

BACKGROUND OF THE INVENTION

1. Field of the Invention

The present invention relates to a biodegradable plastic composition, a molded article thereof and a method for controlling biodegradation rate; in more detail, the present invention relates to a biodegradable plastic composition enabling to adjust biodegradation rate, improve hydrolysis resistance and heat resistance, and retain transparency by compounding a carbodiimide compound and an antioxidant to the biodegradable plastic, applications thereof such as a biodegradable molded article and a method for controlling biodegradation rate of the biodegradable plastic.

2. Description of the Prior Art

Recently, research and development of biodegradable plastics have been promoted on the background of increasing attention to the need and significance of environmental preservation, while problems such as environmental contamination caused by plastic wastes have been attracting attention.

The biodegradable plastics are roughly classified into aliphatic polyesters having polyester groups in a molecular backbone thereof (including those produced by microorganisms), natural macromolecule type polymers such as cellulose, polysaccharides produced by microorganisms, polyvinyl alcohol (PVA) and polyethers such as polyethylene glycol (PEG).

Among them, aliphatic polyesters have not been utilized as the biodegradable plastic because they have, in general, low melting points and poor heat stabilities in their production stages, and a sufficiently large molecular weight has not been obtained to provide physical properties suitable for practical molded articles. However, with technological developments to solve these problems, a high molecular weight of aliphatic polyester has come out, and started to be used in such fields as materials for agriculture, forestry and fishery (mulch film, plantation pot, fishing line, fishing net, and the like), materials for civil engineering work (water holding sheet, net for plants, sandbag, and the like) and packaging and containers field (those difficult to be recycled due to adhered soil, foods, and the like).

The biodegradable plastics including the above-described aliphatic type polyesters, however, should not only have the same level of functions as the conventional plastics (in characteristics such as strength, water resistance, formability and heat resistance) in use, but also be rapidly degradable by microorganisms generally present in the nature in disposal thereof.

Based on these situations, several methods for controlling the degradation rate of the biodegradable plastic have been proposed, for example, a method aiming at shortening of the degradation period by an addition of hydrolase (JA-A-4-168149), and another method aiming, contrarily, at an extension of the degradation period by reducing unreacted monomers and impurities in a polymer and low molecular weight compounds such as linear or cyclic oligomers (JA-A-9-12688), are known.

Notwithstanding these proposals, however, the biodegradable plastic consisting of the aliphatic polyester according to the conventional arts has currently such problems as a hydrolysis reaction progressing in the aliphatic polyester induced by exposure to moisture in an ambient atmosphere or by being heated during a production process of pellets thereof, which are raw materials of plastic products, or in a production process of products from said pellets, leading to lowering or dispersion of initial properties of molded articles as well as an unstable biodegradability of products thereof, and thus the biodegradability, that is, an adjustment of the biodegradation rate, is not yet sufficient.

The present inventors proposed, in JA-A-11-80522, a biodegradable plastic composition with a controlled biodegradation rate by compounding a carbodiimide compound into the biodegradable plastic. Although this proposal improved the hydrolysis resistance or a function for adjusting biodegradability, the improvement in heat resistance was not enough. The proposal also had another problem of losing transparency of product, in particular, in a poly(lactic acid) type biodegradable plastic product with an increased compounding amount of the carbodiimide compound to enhance the hydrolysis resistance.

JA-A-2001-525473 (WO99/29768) also proposes a method aiming at an extension of the degradation period by compounding an aromatic carbodiimide as a hydrolysis stabilizer to the biodegradable polymer; however, the method had a problem of losing transparency of biodegradable plastic products irrespective of the addition amount.

SUMMARY OF THE INVENTION

An object of the present invention is therefore to solve the problems of the conventional arts and to provide a biodegradable plastic composition enabling the adjustment of a biodegradation rate, improve hydrolysis resistance and heat resistance, and retain transparency, a molded article thereof and a method for controlling biodegradation rate of the biodegradable plastic.

The present inventors, after an extensive study to solve the above-described problems of the conventional arts, found that by compounding specified amounts of a carbodiimide compound having at least one carbodiimide group (including a polycarbodiimide compound) in a molecule and a specified antioxidant in combination to a biodegradable plastic, in particular, an aliphatic polyester, the resulting biodegradable plastic composition exhibited improvements in hydrolysis resistance and heat resistance, and thereby enabled the adjustment of the biodegradation rate thereof and the retention of transparency thereof. The present invention was thus accomplished based on these findings described above.

Namely, in accordance with the first aspect of the present invention, there is provided a biodegradable plastic composition comprising (A) 100 parts by weight of biodegradable plastic; (B) 0.01 to 5 parts by weight of a carbodiimide compound; and (C) 0.01 to 3 parts by weight of an antioxidant.

In accordance with the second aspect of the present invention, there is provided the biodegradable plastic composition according to the first aspect, characterized in that said biodegradable plastic (A) is an aliphatic polyester.

In accordance with the third aspect of the present invention, there is provided the biodegradable plastic composition according to the first aspect, characterized in that said carbodiimide compound (B) is an aliphatic polycarbodiimide compound.

In accordance with the fourth aspect of the present invention, there is provided the biodegradable plastic composition according to the first aspect, characterized in that said antioxidant (C) is a hindered phenol type antioxidant alone or a mixture of a hindered phenol type antioxidant and a phosphate type antioxidant.

In accordance with the fifth aspect of the present invention, there is provided the biodegradable plastic composition according to the fourth aspect, characterized in that said antioxidant (C) is a mixture of said hindered phenol type antioxidant and said phosphate type antioxidant.

In accordance with the sixth aspect of the present invention, there is provided the biodegradable plastic composition according to the fourth aspect, characterized in that said hindered phenol type antioxidant is a compound with a molecular weight of not less than 400.

In accordance with the seventh aspect of the present invention, there is provided the biodegradable plastic composition according to the fourth aspect, characterized in that said phosphite type antioxidant is an aromatic compound having a t-butyl group.

In accordance with the eighth aspect of the present invention, there is provided the biodegradable plastic composition according to the first aspect, characterized in that the amount of said carbodiimide compound (B) is 0.1 to 3 parts by weight.

In accordance with the ninth aspect of the present invention, there is provided the biodegradable plastic composition according to the first aspect, characterized in that the amount of said antioxidant (C) is 0.1 to 2 parts by weight.

In accordance with the tenth aspect of the present invention, there is provided a molded article of a biodegradable plastic obtained by molding the biodegradable plastic composition according to any one of the aspects 1 to 9.

In accordance with the eleventh aspect of the present invention, there is provided the molded article of a biodegradable plastic according to the tenth aspect, which is in the form of a film or sheet.

In accordance with the twelfth aspect of the present invention, there is provided a method for controlling biodegradation rate of a biodegradable plastic, characterized in that a biodegradable plastic (A) is mixed with specified amounts of a carbodiimide compound (B) and an antioxidant (C) so that the hydrolysis resistance and transparency of said biodegradable plastic (A) is improved.

As described above, the present invention relates to a biodegradable plastic composition and the like, characterized in that a biodegradable plastic (A) is compounded with specified amounts of a carbodiimide compound (B) and an antioxidant (C), and a preferred embodiment thereof includes the following:

(1) The biodegradable plastic composition according to the first aspect, characterized in that said carbodiimide compound (B) is a monocarbodiimide compound.
(2) The biodegradable plastic composition according to the above first aspect, characterized in that said monocarbodiimide compound is dicyclohexylcarbodiimide or diisopropylcarbodiimide.
(3) The biodegradable plastic compound according to the second aspect, characterized in that said aliphatic polyester is poly(lactic acid) type polyester.
(4) The biodegradable plastic compound according to the fourth aspect, characterized in that said hindered phenol type antioxidant is pentaerythritol tetrakis[3-(3,5-di-t-butyl-4-hydroxyphenyl)]propionate.
(5) The biodegradable plastic compound according to the fifth aspect, characterized in that said antioxidant (C) is a mixture of a hindered phenol type antioxidant with a molecular weight of not less than 400 and a phosphite type antioxidant.
(6) The biodegradable plastic compound according to the seventh aspect, characterized in that said aromatic phosphite type antioxidant with a t-butyl group is tris(2,4-di-t-butyl phenyl)phosphite or bis(2,4-di-t-butylphenylpentaerythritol)phosphite.

DETAILED DESCRIPTION OF THE INVENTION

Hereinbelow, the present invention will be described in detail for each element.

1. Biodegradable Plastic

The biodegradable plastic as a main component used in the biodegradable plastic compound of the present invention includes, for example, those derived from polyesters metabolized by microorganisms, and among them, aliphatic polyesters are preferable because they are easily metabolized by microorganism.

In general, the biodegradable plastic is believed to undergo biodegradation through the following processes.

Namely, in a decomposition of a polymer material (biodegradable plastic) discharged into an environment, (i) A polymer-degrading enzyme is adsorbed on the surface of the polymer material. This enzyme is a substance secreted extracellularly by a certain kind of microorganism. (ii) The enzyme, then, breaks such chemical bonds of polymer chains as ester, glycosidic and peptide linkages by a hydrolysis reaction. (iii) As a result, the polymer material is reduced in a molecular weight thereof and decomposed even to a monomer unit by a degrading enzyme. (iv) Finally, decomposed products are further metabolized and utilized by various microorganisms and converted to carbon dioxide, water and bacterial cell components.

The aliphatic polyesters which is easily metabolized and hydrolyzed by microorganisms include:
(1) poly(lactic acid) (polylactide) type aliphatic polyesters;
(2) aliphatic polyesters as products of condensation reaction of polyvalent alcohols and polybasic acids;
(3) aliphatic polyesters produced by microorganisms such as polyhydroxybutylate (PHB);
(4) polycaprolactone (PCL) type aliphatic polyesters; and any of the above aliphatic polyesters can be preferably used as the biodegradable plastic in the present invention.

Further, in the present invention, the biodegradable plastic is not limited to the above-described aliphatic polyesters but any types thereof can be used as long as they have such chemical bonds as ester, glycosidic and peptide linkages which facilitate a scission of polymer chain in the biodegradable plastic by the hydrolysis reaction. Such type of polymers include, for example, a carbonate copolymer of the aliphatic polyester produced by randomly introducing a carbonate structure into a molecular chain backbone of the aliphatic polyester, and a copolymer of the aliphatic polyester having amide bonds and a polyamide produced by introducing nylon into a molecular chain backbone of the aliphatic polyester.

Next, the aliphatic polyester will be further described in more detail.

(1) Poly(Lactic Acid) (Polylactide) Type Aliphatic Polyester

The poly(lactic acid) (polylactide) type aliphatic polyester includes polylactides, and specifically polymers of oxyacids such as lactic acid, malic acid and glycolic acid and copolymers thereof including, for example, poly(lactic acid), poly (α-malic acid), polyglycolic acid and a copolymer of glycolic acid and lactic acid, in particular, a hydroxycarboxylic acid type aliphatic polyester, typically represented by poly (lactic acid).

The above-described poly(lactic acid) type aliphatic polyester can be obtained, in general, by a ring-opening polymerization method of lactide, as a cyclic diester, and corresponding lactones (so-called a lactide method), as well as a direct dehydration condensation method of lactic acid and a polycondensation method of formalin and carbon dioxide, as a method other than the lactide method.

Further, examples of a catalyst for producing the above-described poly(lactic acid) type aliphatic polyester include tin, antimony, zinc, titanium, iron and aluminum compounds. Among them, a tin-based or an aluminum-based catalyst is preferable, and tin octoate and aluminum acetylacetonate are particularly preferable.

Among the above-described poly(lactic acid) type aliphatic polyesters, poly(L-lactic acid) obtained by the ring-opening polymerization of the lactide is preferable, because poly(L-lactic acid) is hydrolyzed to L-lactic acid, whose safety has already been confirmed. However, the poly(lactic acid) type aliphatic polyesters used in the present invention are not limited to the above type polyesters, and therefore the lactide used for producing the poly(lactic acid) is also not limited to L-type.

(2) Aliphatic Polyester as a Product of Condensation Reaction of Polyvalent Alcohols and Polybasic Acids Examples of the aliphatic polyester as a product of condensation reaction of polyvalent alcohols and polybasic acids include an aliphatic glycol/polybasic acid type polyester obtained by reacting aliphatic glycols with an aliphatic polybasic acid (or anhydride thereof) in the presence of a catalyst, or a high molecular weight of aliphatic glycol/polybasic acid type polyester obtained by reacting using a small amount of coupling agent, if necessary.

The aliphatic glycols for producing the aliphatic glycol/polybasic acid type polyester used in the present invention include, for example, ethylene glycol, 1,4-butandiol, 1,6-hexanediol, decamethylene glycol, neopentyl glycol and 1,4-cyclohexanedimethanol, and ethylene oxide can also be used. In this connection, these glycols may be used in combination of two or more types thereof.

As the aliphatic polybasic acids and the anhydrides thereof to form the aliphatic glycol/polybasic acid type polyester by reacting with the above-described aliphatic glycols, such compounds as succinic acid, adipic acid, suberic acid, sebacic acid, dodecanic acid, and succinic anhydride and adipic anhydride are generally available in the market, and can be used. In this connection, these polybasic acids and anhydrides thereof may be used in combination of two or more types thereof.

The above-described glycols and polybasic acids are of aliphatic types, but a small amount of other components, for example, aromatic glycols and aromatic polybasic acids such as trimellitic anhydride and pyromellitic anhydride can be used in combination with the above-described glycols and polybasic acids. However, an amount of the aromatic glycol or the aromatic polybasic acid to be incorporated should not be higher than 20 parts by weight, preferably not higher than 10 parts by weight, and more preferably not higher than 5 parts by weight, based on 100 parts by weight of the aliphatic glycols, because the incorporation of these aromatic components deteriorates the biodegradability.

In addition, examples of a catalyst to produce the above-described aliphatic glycol/polybasic acid type polyester are salts of organic acids, alkoxides and oxides of such metals as titanium, tin, antimony, cerium, zinc, cobalt, iron, lead, manganese, aluminum, magnesium and germanium, and among them, a tin-based or an aluminum-based compound is preferable.

The above-described aliphatic glycol/polybasic acid type polyester may be produced by reacting an equivalent amount of the aliphatic glycol and the aliphatic polybasic acid together with the catalyst by heating, using a solvent appropriately selected depending on raw material compounds, if necessary, and a prepolymer with a low degree of polymerization can be produced by controlling the progress of the reaction.

In the production of the above-described aliphatic glycol/polybasic acid type polyester, a coupling agent can be used, in particular, for the prepolymer with low degree of polymerization, to further increase a number average molecular weight thereof. Examples of said coupling agent include diisocyanate, oxazoline, diepoxy compounds and acid anhydrides, and particularly diisocyanate is preferably used.

The diisocyanate as the above-described coupling agent is not specifically limited in type, but includes 2,4-tolylene diisocyanate, mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate, isophorone diisocyanate and 4,4'-dicyclohexylmethane diisocyanate. Hexamethylene diisocyanate is particularly preferable in view of a hue of the aliphatic glycol/polybasic acid type polyester obtained and a reactivity in incorporating into the above-described prepolymer.

Amount of the above-described coupling agent to be used is 0.1 to 5 parts by weight, preferably 0.5 to 3 parts by weight based on 100 parts by weight of the above-described prepolymer. An amount less than 0.1 parts by weight results in an insufficient coupling reaction, whereas an amount above 5 parts by weight tends to cause a gelation.

Moreover, the above-described aliphatic glycol/polybasic acid type polyester may be a modified polyester in which terminal hydroxyl groups are capped by other compounds via double bond, urethane bond or urea bond, or a degenerated aliphatic glycol/polybasic acid type polyester.

Typical examples of the aliphatic polyester on the market, as a condensation product of polyvalent alcohols and polybasic acids, are poly(butylene succinate) (PBS) and poly(ethylene succinate) (PES).

Examples of the poly(butylene succinate) (PBS) type aliphatic polyester are, for example, poly(butylene succinate) (PBS) made from butanediol and succinic acid and an adipate copolymer (PBSA) obtained by copolymerizing adipic acid to accelerate biodegradability, and a commercial product such as "Bionolle(R)" supplied from Showa Highpolymer Co., Ltd. is known.

In addition, poly(ethylene succinate) (PES) is also commercially available, and a commercial product such as "Lunarle SE(R)" supplied from Nippon Shokubai Co., Ltd.

(3) Aliphatic Polyester Produced by Microorganisms

Certain kinds of microorganisms accumulate a polyester in their cells. The polyester produced by microorganisms is a thermoplastic polymer with a certain melting point derived from organisms. Such polyester is decomposed by an enzyme secreted extracellularly by a microorganism in natural environment and completely disappears because decomposition products are consumed by the microorganism.

Such (aliphatic) polyester produced by microorganisms includes polyhydroxybutyrate (PHB), poly(hydroxybutyric acid-hydroxypropionic acid)copolymer and poly(hydroxybutyric acid-hydroxyvaleric acid).

(4) Polycaprolactone (PCL) Type Aliphatic Polyester

Polycaprolactone, a kind of aliphatic polyester, is obtained by a ring-opening polymerization of ε-caprolactone, and can be decomposed by various bacteria, although it is a water-insoluble polymer.

Polycaprolactone is an aliphatic polyester expressed by a general formula: —$(O(CH_2)_5CO)_n$—, and as a commercial product of the polycaprolactone type aliphatic polyester, for example, "Tone(R)" supplied from Nippon Unicar Co., Ltd. is known.

2. Carbodiimide Compound

As a carbodiimide compound (including of a polycarbodiimide compound) having at least one carbodiimide group in a molecule, used in the present invention, those synthesized by commonly well known methods may be used. The compound can be obtained, for example, by conducting a decarboxylation condensation reaction of various polyisocyanates using an organophosphorus compound or an organometallic compound as a catalyst at a temperature not lower than about 70° C., without using any solvent or using an inert solvent.

Examples of a monocarbodiimide compound included in the above-described carbodiimide compounds are dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide and di-β-naphthylcarbodiimide, and among them, dicyclohexylcarbodiimide or diisopropylcarbodiimide is particularly preferable in view of easiness of industrial availability.

Further, as a polycarbodiimide compound included in the above-described carbodiimide compounds, those produced by various methods may be used, but basically those produced by conventional production methods for polycarbodiimide [for example, the methods disclosed in U.S. Pat. No. 2,941,956, JP-B-47-33279, J. Org. Chem. 28, 2069–2075 (1963) and Chemical Review, 1981, Vol. 81, No.4, p619–621] can be used.

An organic diisocyanate, as a raw material for producing a polycarbodiimide compound includes, for example, aromatic diisocyanate, aliphatic diisocyanate, alicyclic diisocyanate or a mixture thereof, and specifically includes 1,5-naphthalene diisocyanate, 4,4'-diphenylmethane diisocyanate, 4,4'-diphenyldimethylmethane diisocyanate, 1,3-phenylene diisocyanate, 1,4-phenylenediisocyanate, 2,4-tolylenediisocyanate, 2,6-tolylene diisocyanate, a mixture of 2,4-tolylene diisocyanate and 2,6-tolylene diisocyanate, hexamethylene diisocyanate, cyclohexane-1, 4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate.

In addition, in the case of the above-described polycarbodiimide compound, a degree of polymerization thereof can be controlled to an appropriate level by using a compound such as monoisocyanate capable to react with a terminal isocyanate group of the polycarbodiimide compound.

The monoisocyanate to control the degree of polymerization thereof by capping a terminal group of the polycarbodiimide compound includes phenyl isocyanate, tolyl isocyanate, dimethylphenyl isocyanate, cyclohexyl isocyanate, butyl isocyanate and naphthyl isocyanate.

Further, the terminal capping agent to control the degree of polymerization by capping a terminal group of the polycarbodiimide compound is not limited to the above-described monoisocyanates, and includes compounds having an active hydrogen capable to react with isocyanate, for example, (i) an aliphatic, aromatic or alicyclic compound having —OH group such as methanol, ethanol, phenol, cyclohexanol, N-methylethanolamine, polyethylene glycol monomethyl ether and polypropylene glycolmonomethyl ether; (ii) a compound having a =NH group such as diethylamine and dicyclohexylamine; (iii) a compound having a =$NH_2$ group such as butylamine and cyclohexylamine; (iv) a compound having a —COOH group such as succinic acid, benzoic acid and cyclohexanecarboxylic acid; (v) a compound having a —SH group such as ethylmercaptan, allylmercaptan and thiophenol; and (vi) a compound having an epoxy group.

The decarboxylation condensation reaction of the above-described organic diisocyanate is performed in the presence of a suitable carbodiimidation catalyst. As the carbodiimidation catalyst to be used, an organophosphorus compound and an organometallic compound [a compound expressed by general formula M—$(OR)_4$, wherein M is titanium (Ti), sodium (Na), potassium (K), vanadium (V), tungsten (W), hafnium (Hf), zirconium (Zr), lead (Pb), manganese (Mn), nickel (Ni), calcium (Ca) and barium (Ba) and the like; R is alkyl group or aryl group having carbon atoms of 1 to 20] are preferable, and phospholeneoxide among organophosphorus compounds and alkoxides of titanium, hafnium and zirconium among organometallic compounds are particularly preferable from the viewpoint of activity.

The above-described phospholeneoxides include specifically 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double bond isomers thereof. Among them, 3-methyl-1-phenyl-2-phospholene-1-oxide is particularly preferable due to easiness in an industrial availability.

According to the present inventors, a function of the carbodiimide compound in the biodegradable plastic composition of the present invention is to be added to cleaved bonds of the biodegradable plastic by hydrolysis and to recombine them.

The carbodiimide compound for the function includes 4,4'-dicyclohexylmethanecarbodiimide (degree of polymerization=2 to 20), tetramethylxylylenecarbodiimide (degree of polymerization=2 to 20), N,N-dimethylphenylcarbodiimide (degree of polymerization=2 to 20) and N,N'-di-2,6-diisopropylphenylcarbodiimide (degree of polymerization=2 to 20) and the like, and is not specifically limited as long as the compound has at least one carbodiimide group in a molecule having the function, but an aliphatic polycarbodiimide compound is preferable in view of safety, stability and compatibility.

Amount of the carbodiimide compound to be added is preferably 0.01 to 5 parts by weight, and more preferably 0.1 to 3.0 parts by weight based on 100 parts by weight of the biodegradable plastic. The amount less than 0.01 parts by weight gives no effect on adjustment or control of the biodegradation rate of the biodegradable plastic composition, whereas the amount over 5 parts by weight may lose the biodegradability of the biodegradable plastic and furthermore may deteriorate the transparency. In this connection, when the biodegradable plastic is required to be used for a long period without degradation, the amount of the carbodiimide compound to be added may be not less than 5 parts by weight.

In the present invention, mixing of the above-described carbodiimide compound into the biodegradable plastic can be performed by dissolving both in an organic solvent, followed by distilling said organic solvent off. As the organic solvent, it is desirable to use an organic solvent which is not only capable to dissolve the biodegradable plastic but also non-polymerizable and has no active hydrogen. The organic solvent includes specifically chloroform and tetrahydrofuran (THF).

Further, in order to mix the above-described carbodiimide compound into the biodegradable plastic, a method of melt mixing using an extruder and a method for adding the carbodiimide compound after the termination of synthesis of the biodegradable plastic.

Here, since a retardation of the biodegradation rate of the biodegradable plastic in accordance with the present invention can be adjusted by a type and an amount of the carbodiimide to be compounded, and the type and the amount of the carbodiimide to be compounded may be determined depending on a final product required.

3. Antioxidant

An antioxidant to be used in combination with the above-described carbodiimide compound in the biodegradable plastic composition of the present invention is preferably a hindered phenol type antioxidant or a mixed antioxidant of a hindered phenol type antioxidant and a phosphite type antioxidant.

The hindered phenol type antioxidant preferably has a molecular weight of not lower than 400, whereas the antioxidant having a lower molecular weight may generate such phenomena as scattering, volatilization and extraction by substances contacted thereto. In particular, since a migration of the antioxidant from the plastic being contacted with foods into the foods may cause a hygiene problem, in the present invention, the antioxidant having a molecular weight of preferably not lower than 400, more preferably not lower than 500 is used. By selecting the antioxidant having a higher molecular weight, such an effect is also provided that a heat resistance of the biodegradable plastic compound can be improved.

The hindered phenol type antioxidant having a molecular weight of not lower than 400 includes, for example, 4,4'-methylene-bis(2,6-di-t-butylphenol) (MW=420), octadecyl-3-(3,5-di-t-butyl-4-hydroxyphenyl)propionate (MW=531) (Trade name "Irganox(R) 1076" supplied from Chiba Specialty Chemical Co., Ltd.), pentaerythritoltetrakis[3-(3,5-di-t-butyl-4-hydroxyphenyl)propionate] (MW=1178) (Trade name "Irganox(R) 1010" supplied from Chiba Specialty Chemical Co., Ltd.), and the like.

Moreover, the phosphite type antioxidant which is preferably used in combination with the above-described hindered phenol type antioxidant includes, for example, an aromatic phosphite having a t-butyl group such as tris (2,4-di-t-butylphenyl)phosphite (Trade name "Irgafos(R) 168" supplied from Chiba Specialty Chemical Co., Ltd.) and bis(2,4-di-t-butylphenylpentaerythritol) diphosphite.

In the biodegradable plastic compound of the present invention, the antioxidant is used in combination with the carbodiimide compound in an effective amount to enable to improve hydrolysis resistance and heat resistance, along with retain transparency.

To attain the object, total amount of antioxidants to be added is preferably 0.01 to 3 parts by weight, and more preferably 0.1 to 2 parts by weight based on 100 parts by weight of the biodegradable plastic. The amount lower than 0.01 parts by weight does not retain, in particular, heat resistance or transparency of the biodegradable plastic, where as the amount over 3 parts by weight has a risk of migration of the antioxidants from plastic being contacted with foods to the foods, and further may deteriorate transparency.

In addition, when the hindered phenol type and the phosphite type antioxidants are used in combination as the antioxidants, a ratio by weight of phenol: phosphite is preferably in a range from 5:1 to 1:5.

Here, the antioxidant for the plastic composition also includes the antioxidant other than the above-described hindered phenol type antioxidant and the phosphite type antioxidant; an aromatic amine type such as diphenylamine and phenyl-α-naphthylamine; and sulfur type antioxidant. These antioxidants may be used within a range not to impair the effects of the present invention. For example, a small amount of the aromatic amine type antioxidant maybe used in combination with the above-described hindered phenol type antioxidant and the phosphite type antioxidant. However, it should be noted that compounding of these aromatic amine type antioxidants deteriorates, in particular, transparency.

In order to mix the antioxidant into the biodegradable plastic in the present invention, a method of melt mixing using an extruder and a method for adding the antioxidant after the termination of synthesis of the biodegradable plastic in the same manner as in the case of the carbodiimide compound.

4. Other Additives and the Like

Other additives may be used optionally in combination in the biodegradable plastic composition of the present invention within a range not to impair the effects of the present invention, such as reinforcing agents, inorganic or organic fillers, heat stabilizers, hindered amine type light stabilizers and UV absorbers, as well as lubricants, waxes, colorants, crystallization promoters and degradable organic substances such as starch, if necessary.

The biodegradable plastic composition of the present invention can stably adjust the biodegradation rate, improve hydrolysis resistance and heat resistance and retain transparency, and therefore suitably used in such fields as materials for agriculture, forestry and fishery (mulch film, mulch sheet, plantation pot, fishing line, fishing net, and the like), materials for civil engineering work (water holding sheet, net for plants, sandbag, and the like) and films for packaging and containers field, in particular, molded articles of the biodegradable plastic such as film, sheet, fiber, bottle and tray.

EXAMPLES

Hereinbelow, the present invention will be explained in more detail using Examples. Physical properties in Examples were measured and evaluated by the following methods.

[Hydrolysis Resistance]

Test sample pieces were left in an air conditioned chamber maintained at 80° C. and 90% RH, respectively, for a fixed period (100 hours), and a ratio (%) of tensile strength after the test to the value before the test was calculated. Hydrolysis resistance was ranked as "good" for the sample with a high ratio (%) of tensile strength.

[Heat Resistance]

Test sample pieces were left in hot water at 120° C. for a fixed period (5 hours), and a ratio (%) of tensile strength after the test to the value before the test was calculated. Heat resistance was ranked as "good" for the sample with a high ratio (%) of tensile strength.

[Transparency]

Film test samples were used to measure haze (cloudiness) (%) using a haze meter in accordance with JIS K7105 "Test methods for optical characteristics of plastics", 6.4 "haze (cloudiness)". Transparency was ranked as "good" for the sample with a low haze (cloudiness) (%)

Before describing Examples and Comparative Examples, synthesis methods for carbodiimide compounds will be described first.

[Synthesis Example 1 for a Carbodiimide Compound]

A mixture of 590 g of 4,4'-dicyclohexylmethane diisocyanate, 62.6 g of cyclohexyl isocyanate and 6.12 g of a carbodiimidation catalyst (3-methyl-1-phenyl-2-phospholene-1-oxide) was reacted at 180° C. for 48 hours to obtain 4,4'-dicyclohexylmethanecarbodiimide (degree of polymerization=10).

[Synthesis Example 2 for a Carbodiimide Compound]

A mixture of 614 g of 4,4'-dicyclohexylmethane diisocyanate added with 20 g of cyclohexylamine was stirred at 100° C. for 1 hour, then added with 2.9 g of a carbodiimidation catalyst (3-methyl-1-phenyl-2-phospholene-1-oxide) and reacted at 185° C. for 30 hours to obtain a carbodiimide (degree of polymerization=8), 4,4'-dicyclohexylmethanecarbodiimide having terminal urea bonds.

[Synthesis Example 3 for a Carbodiimide Compound]

A mixture of 500 g of 4,4'-dicyclohexylmethane diisocyanate and 5.0 g of a carbodiimidation catalyst (tetrabutyl titanate) was reacted at 180° C. for 12 hours, then added with 40.0 g of polyethylene glycol monomethyl ether and reacted at 120° C. for 3 hours to convert the terminal isocyanate groups to urethane groups to obtain 4,4'-dicyclohexylmethanecarbodiimide having terminal polyethylene glycol groups (degree of polymerization=5.5).

EXAMPLES 1–3

Using an aliphatic polyester resin mainly composed of poly(butylene succinate/adipate) as a biodegradable plastic, 0.5 parts by weight each of carbodiimide compounds synthesized in Synthesis Examples 1–3 and 0.5 parts by weight each of phenol type antioxidant, pentaerythritoltetrakis[3-(3,5-di-t-butyl-4-hydroxyphenyl)propionate] (Trade name "Irganox(R) 1010"), based on 100 parts by weight of the biodegradable plastic (aliphatic polyester), were dry blended, followed by mixing in a twin screw extruder to prepare films with a thickness of 200 μm through T-die. Test pieces according to JIS No.4 dumbbell were punched from these films to evaluate physical properties. Table 1 shows compositions and evaluation results thereof.

Comparative Example 1

By repeating the same procedures as in Example 1 except that the carbodiimide compounds were not compounded, films were prepared to evaluate physical properties. Table 1 shows compositions and evaluation results thereof.

Comparative Example 2

By repeating the same procedures as in Example 1 except that the antioxidant was not compounded, films were prepared to evaluate physical properties. Table 1 shows compositions and evaluation results thereof.

Comparative Example 3

By repeating the same procedure as in Example 1 except that the antioxidant was not compounded and 8 parts by weight of the carbodiimide compound was compounded, films were prepared to evaluate physical for properties. Table 1 shows compositions and evaluation results thereof.

TABLE 1

|  | Example 1 | Example 2 | Example 3 | Comparative Example 1 | Comparative Example 2 | Comparative Example 3 |
|---|---|---|---|---|---|---|
| 1. Composition (parts by weight) | | | | | | |
| (A) Biodegradable plastic (Aliphatic polyester) | | | | | | |
| Poly(butylene succinate/adipate) | 100 | 100 | 100 | 100 | 100 | 100 |
| Poly(lactic acid) | — | — | — | — | — | — |
| (B) Carbodiimide compound | | | | | | |
| Synthesis Example 1 | 0.5 | — | — | — | 0.5 | 8.0 |
| Synthesis Example 2 | — | 0.5 | — | — | — | — |
| Synthesis Example 3 | — | — | 0.5 | — | — | — |
| (C) Antioxidant | | | | | | |
| Phenol type | | | | | | |
| Pentaerythritoltetrakis[3-(3,5-di-t-butyl-4-hydoroxyphenyl)propionate] | 0.5 | 0.5 | 0.5 | 0.5 | — | — |
| Phosphite type | | | | | | |
| Tris(2,4-di-t-butylphenyl)phosphite | — | — | — | — | — | — |
| 2. Evaluation results | | | | | | |
| ①Hydrolysis resistance Ratio of strength (%) | 85.4 | 80.4 | 86.2 | 20.9 | 53.8 | 86.8 |
| ②Heat resistance Ratio of strength (%) | 83.8 | 79.0 | 82.5 | 0 | 37.1 | 69.5 |

EXAMPLES 4–6

Using an aliphatic polyester resin mainly composed of poly(lactic acid) as a biodegradable plastic, 0.5 parts by weight each of carbodiimide compounds synthesized in Synthesis Examples 1–3 and 0.5 parts by weight each of phenol type antioxidant, pentaerythritoltetrakis[3-(3,5-di-t-butyl-4-hydroxyphenyl)propionate] (Trade name "Irganox(R) 1010") and 1.0 parts by weight of phosphite type antioxidant, tris (2,4-di-t-butylphenyl)phosphite (Trade name "Irgafos(R) 168"), based on 100 parts by weight of the biodegradable plastic (aliphatic polyester), were dry blended, followed by mixing in a twin screw extruder to prepare thick films with a thickness of 300 μm through T-die. Test pieces according to JIS No.4 dumbbell were punched from these films to evaluate physical properties. Table 2 shows compositions and evaluation results thereof.

Comparative Example 4

By repeating the same procedures as in Example 4 except that the carbodiimide compounds were not compounded, films were prepared to evaluate physical properties. Table 2 shows compositions and evaluation results thereof.

Comparative Example 5

By repeating the same procedures as in Example 4 except that the antioxidant was not compounded, films were prepared to evaluate physical properties. Table 2 shows compositions and evaluation results thereof.

Comparative Example 6

By repeating the same procedures as in Example 4 except that the antioxidant was not compounded and 8 parts by weight of the carbodiimide compound was compounded, films were prepared to evaluate physical properties. Table 2 shows compositions and evaluation results thereof.

EXAMPLES 7–9

Using the aliphatic polyester resin mainly composed of poly(lactic acid) as a biodegradable plastic, the same procedures as in Example 1 were repeated except that 0.1, 1 and 5 parts by weight each of the carbodiimide compound synthesized in Synthesis Example 1 and 0.5 parts by weight each of the phenol type antioxidant, pentaerythritoltetrakis[3-(3,5-di-t-butyl-4-hydroxyphenyl)propionate] (Trade name "Irganox(R) 1010") based on 100 parts by weight of the biodegradable plastic (aliphatic polyester), were dry blended. Films were prepared to evaluate physical properties. Table 3 shows compositions and evaluation results thereof.

EXAMPLES 10–12

Using the aliphatic polyester resin mainly composed of poly(lactic acid) as a biodegradable plastic, the same procedures as in Example 1 were repeated except that 1 parts by weight of the carbodiimide compound synthesized in Synthesis Example 1 and 0.1, 1 and 3 parts by weight each of the phenol type antioxidant, pentaerythritoltetrakis[3-(3,5-di-t-butyl-4-hydroxyphenyl)propionate] (Trade name "Irganox(R) 1010") based on 100 parts by weight of the biodegradable plastic (aliphatic polyester), were dry blended. Films were prepared to evaluate physical properties. Table 3 shows compositions and evaluation results thereof.

EXAMPLE 13

As Example 13, by repeating the same procedures as in Example 11 except that 1 part by weight of the carbodiimide compound synthesized in Synthesis Example 1 and 1 part by weight of a phenol type antioxidant (Trade name "Sumilizer BHT": molecular weight of 220), were dry blended. Films were prepared to evaluate physical properties. Table 3 shows compositions and evaluation results thereof.

TABLE 2

|  | Example 4 | Example 5 | Example 6 | Comparative Example 4 | Comparative Example 5 | Comparative Example 6 |
|---|---|---|---|---|---|---|
| 1. Composition (parts by weight) (A) Biodegradable plastic (Aliphatic polyester) | | | | | | |
| Poly(butylene succinate/adipate) | — | — | — | — | — | — |
| Poly(lactic acid) | 100 | 100 | 100 | 100 | 100 | 100 |
| (B) Carbodiimide compound | | | | | | |
| Synthesis Example 1 | 0.5 | — | — | — | 0.5 | 8.0 |
| Synthesis Example 2 | — | 0.5 | — | — | — | — |
| Synthesis Example 3 | — | — | 0.5 | — | — | — |
| (C) Antioxidant Phenol type | | | | | | |
| Pentaerythritoltetrakis[3-(3,5-di-t-butyl-4-hydoroxyphenyl)propionate) Phosphite type | 0.5 | 0.5 | 0.5 | 0.5 | — | — |
| Tris(2,4-di-t-butylphenyl)phosphite | 1.0 | 1.0 | 1.0 | 1.0 | — | — |
| 2. Evaluation results | | | | | | |
| ①Hydrolysis resistance Ratio of strength (%) | 93.8 | 91.5 | 93.3 | 12.6 | 70.2 | 96.0 |
| ②Heat resistance Ratio of strength (%) | 94.0 | 92.3 | 93.1 | 0 | 39.7 | 78.0 |
| ③Transparency haze (%) | 2.2 | 2.3 | 2.4 | 2.0 | 2.9 | 57.3 |

TABLE 3

|  | Example 7 | Example 8 | Example 9 | Example 10 | Example 11 | Example 12 | Example 13 |
|---|---|---|---|---|---|---|---|
| 1. Composition (parts by weight) | | | | | | | |
| (A) Biodegradable plastic | | | | | | | |
| (Aliphatic polyester) | | | | | | | |
| Poly(butylene succinate/adipate) | — | — | — | — | — | — | — |
| Poly(lactic acid) | 100 | 100 | 100 | 100 | 100 | 100 | 100 |
| (B) Carbodiimide compound | | | | | | | |
| Synthesis Example 1 | 0.1 | 1.0 | 5.0 | 1.0 | 1.0 | 1.0 | 1.0 |
| Synthesis Example 2 | — | — | — | — | — | — | — |
| Synthesis Example 3 | — | — | — | — | — | — | — |
| (C) Antioxidant | | | | | | | |
| Phenol type | | | | | | | |
| Pentaerythritoltetrakis[3-(3,5-di-t-butyl-4-hydoroxyphenyl)propionate] | 0.5 | 0.5 | 0.5 | 0.1 | 1.0 | 3.0 | — |
| 2,6-di-t-butyl-4-methylphenol | — | — | — | — | — | — | 1.0 |
| Phosphite type | | | | | | | |
| Tris(2,4-di-t-butylphenyl)phosphite | — | — | — | — | — | — | — |
| 2. Evaluation results | | | | | | | |
| ①Hydrolysis resistance Ratio of strength (%) | 73.4 | 92.5 | 98.9 | 80.5 | 88.5 | 83.5 | 70.5 |
| ②Heat resistance Ratio of strength (%) | 74.0 | 94.5 | 93.1 | 83.2 | 87.5 | 83.1 | 61.5 |

As obvious from the results of Examples and Comparative Examples shown in Table 1–3, it was found that the biodegradable plastic composition of the present invention consisting of compounding a carbodiimide compound and an antioxidant to the biodegradable plastic exhibited remarkable improvements in hydrolysis resistance, that is, a resistance to biodegradation induced by hydrolysis, and heat resistance, compared with the biodegradable plastic composition without compounding the carbodiimide compounds or antioxidant, for example, as the compositions in Comparative Example 1 and Comparative Example 2.

Further, it was also found that the biodegradable plastic composition of the present invention compounded with the mixed antioxidants of phenol type antioxidant and phosphite type antioxidant in combination (Examples 4 to 6) also exhibited an improvement in transparency.

Moreover, it was also found that the biodegradable plastic compositions of the present invention compounded with various compounding amounts of the carbodiimide compound in Examples 1 and 7 to 9, both of hydrolysis resistance and heat resistance were improved approximately in proportion to the compounding amount thereof, and thus biodegradation rate could be stably controlled by increasing or decreasing the compounding amount of the carbodiimide compound.

Furthermore, in Examples 10 to 12 with various compounding amounts of the phenol type antioxidant and Example 13 with a different type of the phenol type antioxidant, in particular, in a comparison of Examples 11 and 13, it was found that the composition compounded with the phenol type antioxidant having a high molecular weight as that in Example 11 exhibited good hydrolysis resistance and heat resistance.

The biodegradable plastic composition of the present invention is characterized in that a specific amount of a carbodiimide compound and an antioxidant are compounded to the biodegradable plastic, and thus provides superior effects enabling one to stably adjust biodegradation rate, improve hydrolysis resistance and heat resistance, and retain transparency.

The biodegradable plastic composition of the present invention, thanks to such superior performances, can be suitably used in such fields as materials for agriculture, forestry and fishery (mulch film, mulch sheet, plantation pot, fishing line, fishing net, and the like), materials for civil engineering work (water holding sheet, net for plants, sandbag, and the like) and films for packaging and containers field, in particular, biodegradable plastic molded articles such as film, sheet, fiber, bottle and tray.

What is claimed is:

1. A biodegradable plastic composition comprising (A) 100 parts by weight of biodegradable plastic; (B) 0.01 to 5 parts by weight of a carbodiimide compound; and (C) 0.01 to 3 parts by weight of an antioxidant.

2. The biodegradable plastic composition according to claim 1, characterized in that said biodegradable plastic (A) is an aliphatic polyester.

3. The biodegradable plastic composition according to claim 1, characterized in that said carbodiimide compound (B) is an aliphatic polycarbodiimide compound.

4. The biodegradable plastic composition according to claim 1, characterized in that said antioxidant (C) is a hindered phenol antioxidant alone or a mixture of a hindered phenol antioxidant and a phosphite antioxidant.

5. The biodegradable plastic composition according to claim 4, characterized in that said antioxidant (C) is a mixture of said hindered phenol type antioxidant and said phosphite antioxidant.

6. The biodegradable plastic composition according to claim 4, characterized in that said hindered phenol antioxidant is a compound with a molecular weight of not less than 400.

7. The biodegradable plastic composition according to claim 4, characterized in that said phosphite antioxidant is an aromatic compound with a t-butyl group.

8. The biodegradable plastic composition according to claim 1, characterized in that the amount of said carbodiimide compound (B) is 0.1 to 3 parts by weight.

9. The biodegradable plastic composition according to claim 1, characterized in that the amount of said antioxidant (C) is 0.1 to 2 parts by weight.

10. A molded article of a biodegradable plastic obtained by molding the biodegradable plastic composition according to claim 1.

11. The molded article of the biodegradable plastic according to claim 10, which is in the form of a film or sheet.

12. A method for controlling biodegradation rate of a biodegradable plastic, characterized in that a biodegradable plastic (A) is mixed with specified amounts of a carbodiimide compound (B) and an antioxidant (C) so that the hydrolysis resistance and transparency of said biodegradable plastic (A) is improved.

13. A molded article of a biodegradable plastic obtained by molding the biodegradable plastic composition according to claim 2.

14. A molded article of a biodegradable plastic obtained by molding the biodegradable plastic composition according to claim 3.

15. A molded article of a biodegradable plastic obtained by molding the biodegradable plastic composition according to claim 4.

16. A molded article of a biodegradable plastic obtained by molding the biodegradable plastic composition according to claim 5.

17. A molded article of a biodegradable plastic obtained by molding the biodegradable plastic composition according to claim 6.

18. A molded article of a biodegradable plastic obtained by molding the biodegradable plastic composition according to claim 7.

19. A molded article of a biodegradable plastic obtained by molding the biodegradable plastic composition according to claim 8.

20. A molded article of a biodegradable plastic obtained by molding the biodegradable plastic composition according to claim 9.

* * * * *